(12) United States Patent
Ashman et al.

(10) Patent No.: US 9,116,060 B2
(45) Date of Patent: Aug. 25, 2015

(54) AUTO-ZEROING ABSOLUTE PRESSURE SENSOR

(75) Inventors: David Alan Ashman, Portland, OR (US); Timothy Alan Higgins, Fort Collins, CO (US); Lawrence B. Marsh, Frederick, MD (US)

(73) Assignee: Hach Company, Loveland, CO (US)

( * ) Notice: Subject to any disclaimer, the term of this patent is extended or adjusted under 35 U.S.C. 154(b) by 545 days.

(21) Appl. No.: 13/478,293

(22) Filed: May 23, 2012

(65) Prior Publication Data

US 2013/0317763 A1    Nov. 28, 2013

(51) Int. Cl.
    *G01L 7/18* (2006.01)
    *G01L 7/14* (2006.01)
(52) U.S. Cl.
    CPC ........................................ *G01L 7/14* (2013.01)
(58) Field of Classification Search
    CPC .............. G01L 7/18; G01L 7/14; G01L 7/00; G06F 19/00
    USPC .......... 702/50, 1, 53, 55, 85, 87, 91, 98, 100, 702/127, 137–138, 140, 166, 168, 188–189, 702/199; 73/1.16, 1.31, 1.34–1.35, 73/1.57–1.59, 1.61–1.62, 1.66, 1.73, 227, 73/290 R, 291, 299, 304 R, 700, 712, 716, 73/719–720, 723, 725–726, 861, 861.42, 73/861.66
    See application file for complete search history.

(56) References Cited

U.S. PATENT DOCUMENTS 3,262,093 A * 7/1966 Junger et al. .................. 367/159
4,083,246 A * 4/1978 Marsh ............................. 73/227

* cited by examiner

*Primary Examiner* — Toan Le
(74) *Attorney, Agent, or Firm* — Ference & Associates LLC (57) ABSTRACT

One aspect provides a method including determining that an absolute pressure sensor is not submersed in a fluid; measuring an atmospheric pressure with the absolute pressure sensor to determine an offset pressure measurement; submersing the absolute pressure sensor in a fluid; and measuring pressure with the absolute pressure sensor; wherein a compensated pressure measurement of the fluid is determined. Other embodiments are disclosed.

18 Claims, 6 Drawing Sheets

$Q = \bar{v} \times A$

Q = FLOW
$\bar{v}$ = AVERAGE VELOCITY
A = AREA $Q = \bar{v} \times A$     Q = FLOW
$\bar{v}$ = AVERAGE VELOCITY
A = AREA

AUTO-ZEROING ABSOLUTE PRESSURE SENSOR

BACKGROUND

Pressure sensors are utilized in a wide variety of environments. One particular use of a pressure sensor is in combination with a velocity sensor in water treatment systems where water flow measurement is typically required for municipalities, including measuring run-off water, water in storm drains or sewers, water running in rivers, lakes, et cetera. However, the amount of flow in any of these systems can be unpredictable and vary with time. Because normal wastewater flows may increase due to storms or other unexpected or uncontrolled events, sewer pipes or sewer systems typically are constructed to be large enough to handle most excessive flow events. Consequently, absent an unexpectedly high fluid collection, wastewater conduits are partially filled and act as open channels. The flow depth typically is only a fraction of the conduit depth. Measuring the flow rate of a fluid in an open conduit poses some challenges.

BRIEF SUMMARY

In summary, one aspect provides a method, comprising: determining that an absolute pressure sensor is not submersed in a fluid; measuring an atmospheric pressure with the absolute pressure sensor to determine an offset pressure measurement; submersing the absolute pressure sensor in a fluid; and measuring pressure with the absolute pressure sensor; wherein a compensated pressure measurement of the fluid is determined.

Another aspect provides an absolute pressure sensor, the absolute pressure sensor comprising: one or more processors; and a storage device storing program code executable by the one or more processors to perform acts comprising: determining that the absolute pressure sensor is not submersed in a fluid; measuring an atmospheric pressure with the sensor not submersed to determine an offset pressure measurement; determining that the absolute pressure sensor is submersed in fluid; and measuring pressure with the sensor submersed; wherein a compensated pressure measurement of the fluid is determined.

A further aspect provides a system, comprising: an absolute pressure sensor, the absolute pressure sensor comprising: one or more processors; and a storage device storing program code executable by the one or more processors to perform acts comprising: determining that the absolute pressure sensor is not submersed in a fluid; measuring an atmospheric pressure with the sensor not submersed to determine an offset pressure measurement; determining that the absolute pressure sensor is submersed in fluid; and measuring pressure with the sensor submersed; wherein a compensated pressure measurement of the fluid is determined.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

As alluded to above, measuring the flow rate of a fluid in an open conduit poses some challenges. The flow rate may vary significantly according to factors such as the slope of the conduit, the roughness of the conduit, the presence of any obstructions and/or changes in direction of the conduit, the nature of the fluid and the viscosity and presence of solid objects or particulate matter in the fluid, and any other interactions between the fluid and the conduit. In addition, the flow depth will play an important part in the flow rate, wherein changes in flow depth will affect the flow velocity, turbulence in the flow, likelihood of obstructions of the flow, et cetera.

Figure 1:
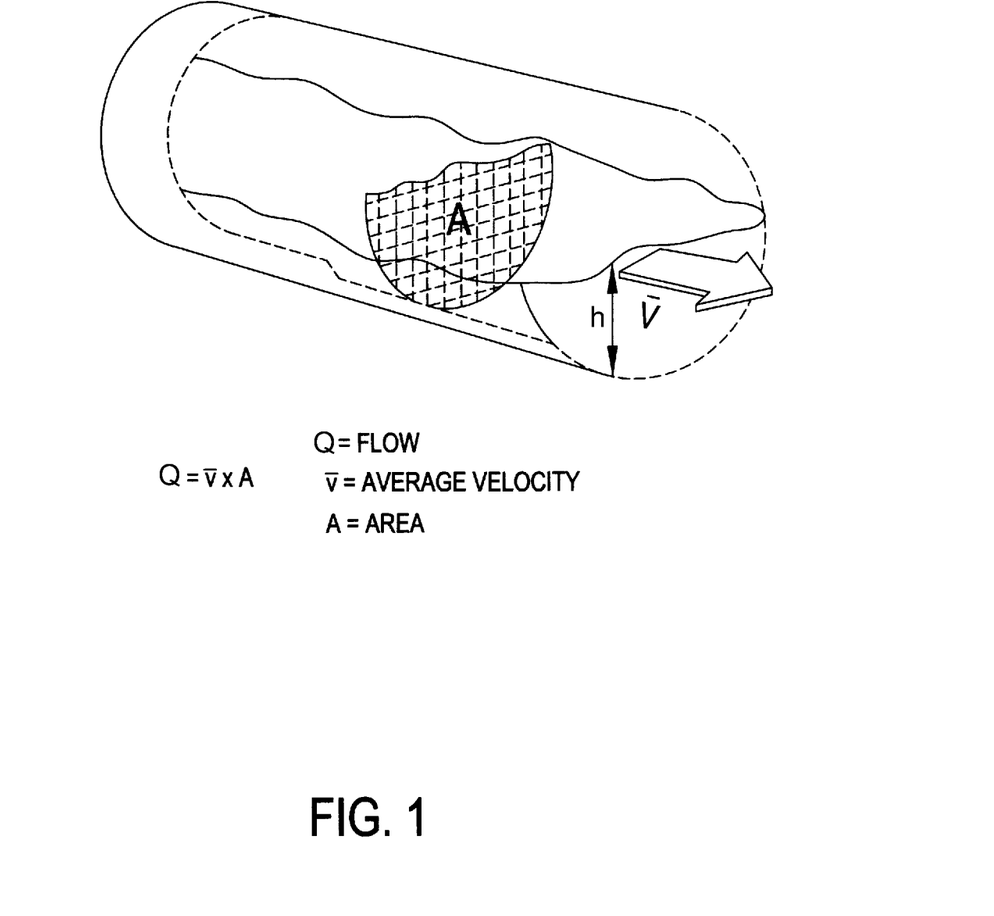
FIG. 1 shows an example operating environment for an example fluid measuring instrument.

As shown in FIG. 1, a flow meter for an open channel flow typically performs a fluid depth measurement (h) and a fluid velocity measurement (v), where the fluid flow rate (Q) is defined as $Q=(v)(A)$, where the cross-sectional area (A) will vary with the flow depth (h). The depth (h) is therefore used to determine the area (A). Depending on the instrument, one or more depth sensors and one or more velocity sensors may be employed. Redundant sensors can be included in order to increase or maintain accuracy.

A type of fluid flow velocity measurement utilizes a submerged electromagnetic probe to make velocity measurements based on Faraday's law of electromagnetic induction. Such probes produce a magnetic flux with a coil winding, typically located within a housing. At least two electrodes can be provided, which measure a voltage induced by the flow of liquid. The induced voltage is generally a function of the velocity of the fluid flow adjacent the electrode.

Along with the fluid velocity, a determination of the fluid depth is also generally required to obtain an accurate flow rate. One method of determining the depth of the fluid is using a pressure measurement. The pressure measurement can be converted to a depth of the fluid using:

$$P = \rho g h$$
$$h = \frac{P}{\rho g}$$

where: h is the fluid depth; ρ is the fluid density; g is the gravitational acceleration; and P is the measured pressure.

The pressure measurement is typically obtained using either a differential pressure sensor or two or more absolute pressure sensors. If two absolute pressure sensors are used, one measures atmospheric pressure and the other measures pressure of the fluid plus atmospheric pressure. Differential pressure sensors generally require at least two ports. A first port is in communication with the fluid and a second port is in communication with the atmosphere to measure the atmospheric pressure. Therefore, the differential pressure sensor only measures the weight of the water above it and is generally not affected by changes in the atmospheric pressure. However, differential pressure sensors need to be properly vented (have a vent tube) and the vent port must remain dry (include desiccant), and require maintenance to obtain accurate measurements. This can be a problem in certain situations where the sensor is submerged and the fluid depth varies. Further, in situations where there is the possibility of a user accidentally dropping the sensor in the fluid, differential pressure sensors may be a poor choice.

In contrast to differential pressure sensors, absolute pressure sensors do not require a vent tube. However, without some additional reference, a change in atmospheric pressure is perceived as a change in the fluid depth. To compensate for atmospheric pressure changes, prior approaches have required at least a second absolute pressure sensor (reference sensor) that always remains above the fluid surface. A downside to this approach is that it requires an excessive number of sensors and consequently, is expensive and cumbersome and measurement error is doubled.

Therefore, there is a need in the art for a pressure sensor that overcomes the difficulties of the above-mentioned approaches. The embodiments described below overcome these and other problems and an advance in the art is achieved. The embodiments described below utilize an absolute pressure sensor that can be zeroed to periodically adjust for changes in atmospheric pressure. Some of the embodiments described below allow the pressure sensor to be automatically-zeroed.

Figure 2:
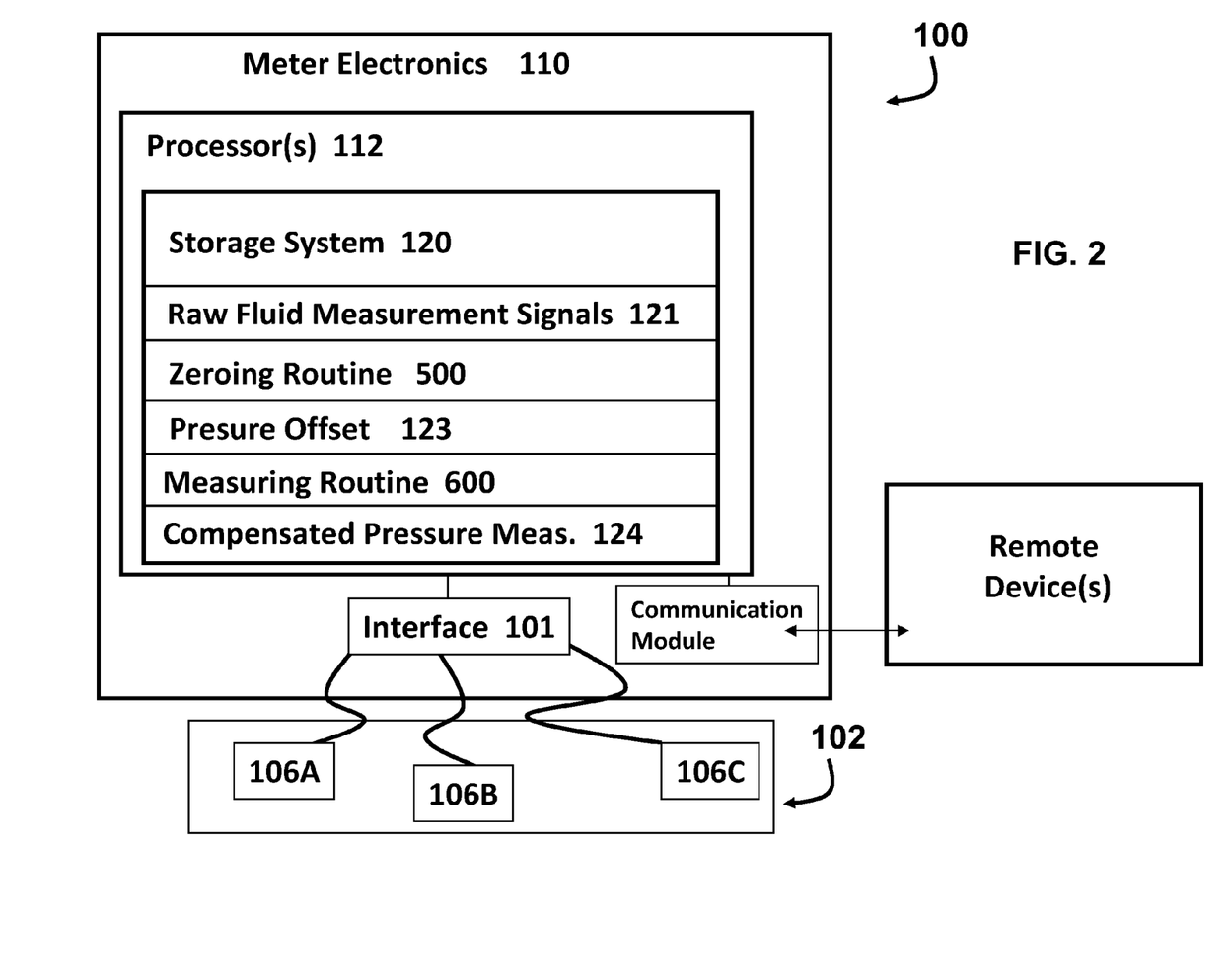
FIG. 2 shows an example fluid measuring instrument according to an embodiment.

FIG. 2 shows a fluid measuring instrument 100 according to an embodiment. The fluid measuring instrument 100 shown in FIG. 2 includes meter electronics 110 and one or more sensors 106A-106C electrically coupled to the meter electronics 110 via one or more corresponding electrical leads or other signal transmission apparatus or arrangement. The meter electronics 110 may be physically attached to the sensors 106A-106C via the leads or the meter electronics 110 may communicate with the sensors 106A-106C via a wireless technology. According to an embodiment, the sensors 106A-106C may be located in a common housing 102. In some embodiments, the meter electronics 110 may be located within the common housing 102 as well. However, in other embodiments, the meter electronics 110 can be remote from the common housing 102.

The one or more sensors 106A-106C can comprise various types of sensors that measure various flow characteristics. According to an embodiment, the first sensor 106A can comprise a pressure sensor. More specifically, the first sensor 106A can comprise an absolute pressure sensor. The first sensor 106A may comprise a variety of different types of absolute pressure sensors, for example a pressure sensor including a pressure transducer such as a strain gauge. The particular type of absolute pressure sensor employed should in no way limit the scope of the description and claims as those skilled in the art will readily recognize how to incorporate the various teachings in the present application with various types of absolute pressure sensors.

According to an embodiment, the second sensor 106B can comprise a velocity sensor, such as an electromagnetic velocity sensor, ultrasonic velocity sensor, optical velocity sensor, et cetera. The particular type of velocity sensor is not important for purposes of the present embodiment and should in no way limit the scope of the present embodiment.

According to an embodiment, the third sensor 106C may comprise a fluid detecting sensor. The fluid detecting sensor 106C can detect if the sensor housing 102 has been submersed in a fluid. In one embodiment, the fluid detecting sensor 106C comprises two or more electrodes exposed outside the sensor housing 102 that utilizes the fluid to complete the electrical circuit between the electrodes. The first, second, and third sensors 106A, 106B, 106C can be positioned within a common sensor housing 102, and in various embodiments may be combined or integrated in various ways so long as the functionality associated with each is somehow achieved.

Moreover, it should be appreciated that while three sensors are shown, the sensor housing 102 may enclose any number of sensors. Therefore, the description and claims should not be limited to three sensors. For example, in some embodiments, the sensor housing 102 may only include the pressure sensor 106A. In other embodiments, the sensor housing 102 may include more than three sensors.

According to an embodiment, the meter electronics 110 can include an interface 101 and one or more processors 112 coupled to the interface 101. The interface 101 can be configured to receive one or more raw measurement signals from the one or more sensors 106A-106B and relay the measurement signals to the processor(s) 112. In addition, the interface 101 can perform any manner of pre-processing operations, such as digitizing the one or more raw measurements, for example. The interface 101 can further perform any manner of pre-amplification or pre-filtering, as desired. Alternatively, the amplification or other pre-processing can be performed in the sensor(s) 106A-106C.

According to an embodiment, the meter electronics 110 can include a storage system 120. The storage system 120 can store various values, measurements, routines, et cetera. For example, the storage system 120 may comprise a zeroing routine 500 for the pressure sensor 106A; a measurement routine 600; a pressure offset 123; and a compensated pressure measurement 124. The routines 500, 600 as well as the pressure offset 123 and compensated pressure measurement 124 are discussed in greater detail below.

Figure 3:
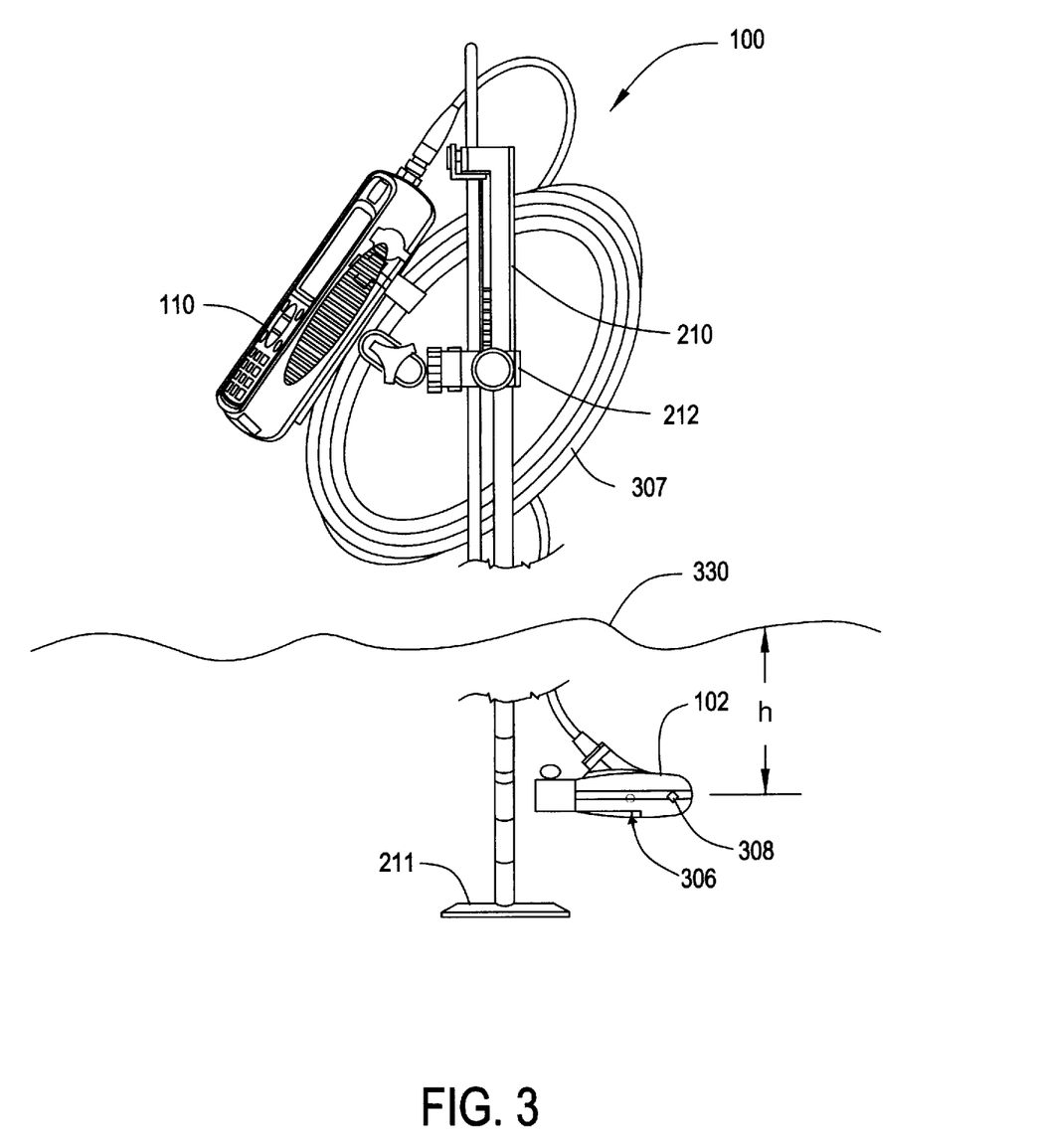
FIG. 3 shows an example fluid measuring instrument according to an embodiment.

FIG. 3 shows the fluid measuring instrument 100 according to an embodiment. According to the embodiment shown, the meter electronics 110 is shown as a portable meter, which is in electrical communication with the sensor housing 102 via the cabling 207. The cabling 307 may comprise the individual leads, for example, corresponding to the individual sensors 106A-106C. The fluid measuring instrument 100 is also shown mounted on a stand 210, including a base 211 with the sensor housing 102 submersed in a fluid 330. The base 211 may be positioned at the bottom of a riverbed, a water conduit, a lake, et cetera. The height of the stand 210 may be adjusted using an adjustable mount 212.

According to the example embodiment shown in FIG. 3, the housing 102 may include the one or more sensors 106A-106C along with any additional electrical components desired. As discussed above, in one embodiment, the one or more sensors 106A-106C may comprise a pressure sensor, a velocity sensor, and a fluid detecting sensor. However, in alternative embodiments, only the pressure sensor 106A may be provided, that is, the fluid measuring instrument 100 may comprise only a pressure sensor without further measuring capabilities. Consequently, while much of the description refers to a fluid measuring instrument 100 with a pressure sensor, a velocity sensor, and the fluid detecting sensor, the embodiments should not be limited to requiring the velocity sensor or the fluid detecting sensor.

According to the example embodiment shown in FIG. 3, the sensor housing 102 can be submersed in the fluid 330 at a depth, h, below a fluid surface. Consequently, the pressure sensor 106A located within the housing 102 can be used to determine a fluid pressure corresponding to the depth, h, of the fluid 330. As shown above with equation (1), the depth, h, can be determined based on the measured fluid pressure. However, because the pressure sensor 106A does not comprise a differential pressure sensor, but rather comprises an absolute pressure sensor, the pressure sensor 106A actually measures the fluid pressure corresponding to the depth, h, as well as the atmospheric pressure. The present embodiment however, allows for zeroing the pressure sensor 106A in order to compensate for variations in atmospheric pressure. This allows an absolute pressure sensor to compensate for changes in atmospheric pressure without the drawbacks of requiring a vent tube as in differential pressure sensors.

In order to measure the pressure of the fluid 330, at least a portion of the pressure sensor 106A needs to be in communication with the fluid 330. According to the embodiment shown, the pressure sensor 106A includes a port 306 formed in the housing 102. The port 306 (located on bottom of sensor) can allow the fluid 330 to act on a sensing portion of the pressure sensor 106A. For example, in some embodiments, the pressure sensor 106A comprises a pressure transducer such as a strain gauge, wherein fluid pressure acts on a diaphragm or flexible element to at least partially deform the flexible element and thereby inducing a current. The induced current is generally proportional to an absolute pressure acting on the diaphragm. Other types of absolute pressure sensors are known and may be utilized. Therefore, the present embodiment is not limited to a particular type of pressure sensor. Some other components of the pressure sensor 106A are not shown in more detail for brevity of the description as they comprise known components that are readily available. Those skilled in the art can easily appreciate that various components of a pressure sensor may be included without further details. Although the pressure sensor 106A comprises an absolute pressure sensor, the atmospheric pressure can be accounted for as discussed in more detail below.

Additionally shown in FIG. 3 is a sensing component 308 for the velocity sensor 106B. In some embodiments, the sensing component 308 can comprise an electrode. This may be true when the velocity sensor 106B comprises an electromagnetic velocity sensor, for example. The velocity sensor 106B may include one or more electrodes 308 in order to determine a fluid velocity.

Figure 4:
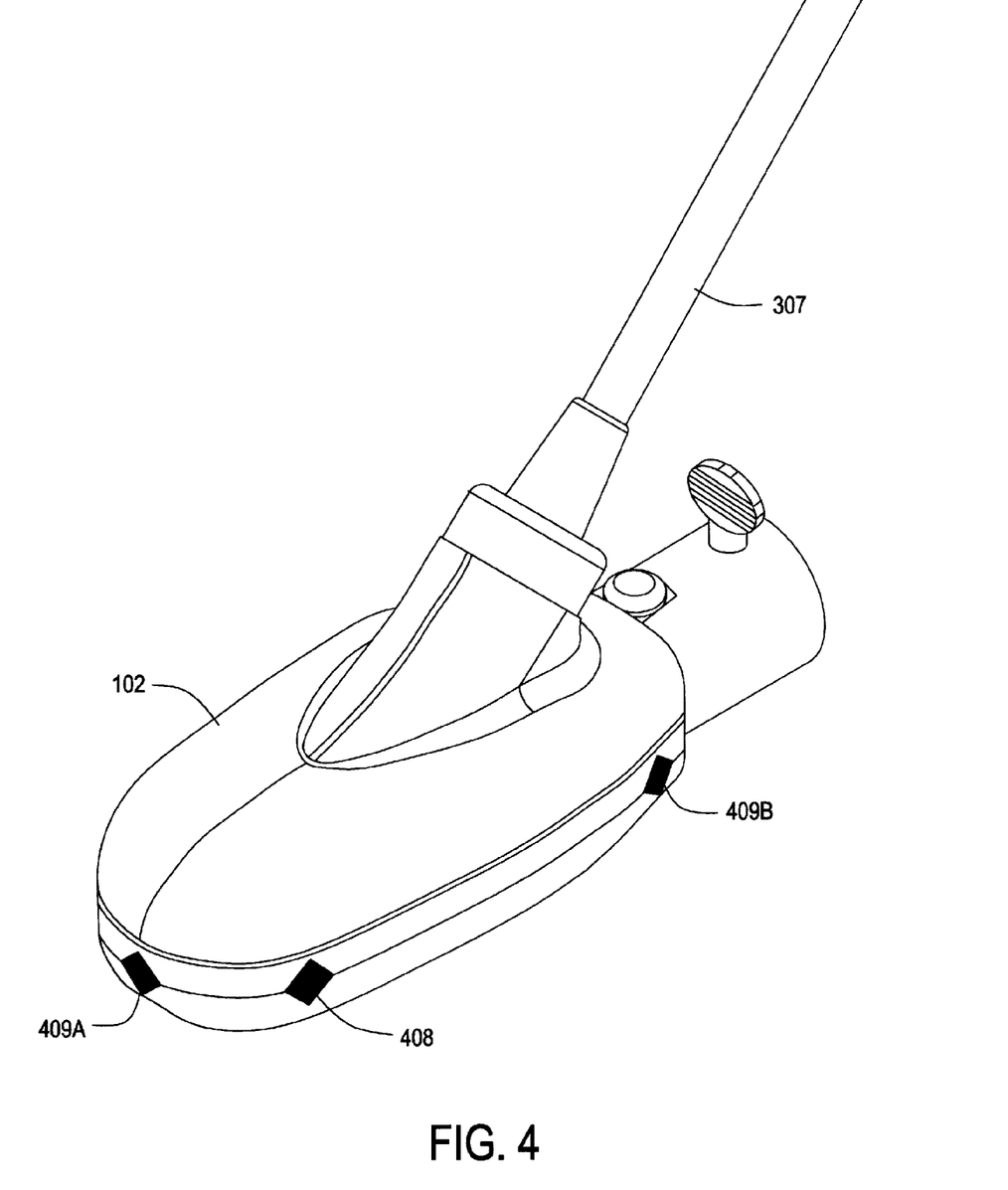
FIG. 4 shows an example sensor housing according to an embodiment.

FIG. 4 shows an example sensor housing 102 according to an embodiment. FIG. 4 shows the side of the sensor housing 102 that is not visible in FIG. 3. As shown, the example sensor housing 102 can additionally include a second sensing component 408, in the form of an electrode, for the velocity sensor 106B. While first and second electrodes 308, 408 are described, it should be appreciated that other sensing components may be used with the velocity sensor 106B based on the particular type of velocity sensor utilized.

In addition to the electrodes 308, 408 used for the velocity sensor 106B, the sensor housing can also include two or more fluid detecting electrodes 409A, 409B, which comprise a portion of the third sensor 106C. The two or more fluid detecting electrodes 409A, 409B can be spaced apart and extend from the sensor housing 102. The fluid detecting electrodes 409A, 409B can be electrically coupled to the meter electronics 110 via a lead 307.

According to an embodiment, the two or more fluid detecting electrodes 409A, 409B can be configured to detect when the sensor housing 102 is positioned under or in a fluid. As can be appreciated, when the sensor housing 102 is exposed to a relatively poor electrical conducting medium, for example air, an electrical circuit between the two fluid detecting electrodes 409A, 409B is open. However, upon inserting the sensor housing 102 into a better electrical conducting medium, for example, water, the electrically conducting medium can complete the electrical circuit between the two or more fluid detecting electrodes 409A, 409B. The completed circuit can be detected by the meter electronics 110 for further processing. For example, the meter electronics 110 may prevent the pressure sensor 106A from being zeroed if the meter electronics 110 determines that the electrical circuit between the fluid detecting electrodes 409A, 409B is closed. According to an embodiment, the fluid detecting electrodes 409A, 409B can be utilized to auto-zero the pressure sensor 106A, thereby allowing an absolute pressure sensor to be utilized while accounting for variations in atmospheric pressure. It should be appreciated that in other embodiments that do not include the fluid detecting electrodes 409A, 409B, the pressure sensor 106A can still be zeroed, but the zeroing may require some input by the user, or another automation means may be utilized.

Figure 5:
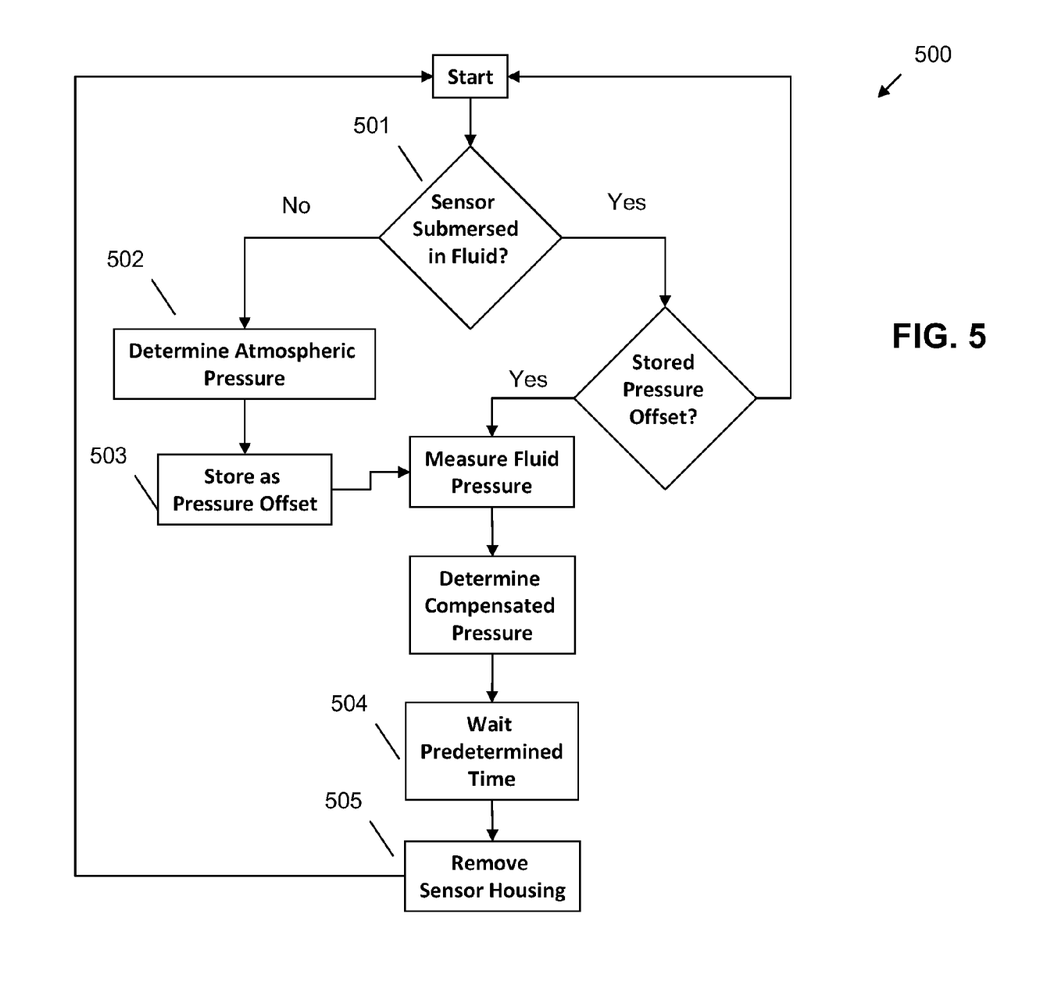
FIG. 5 shows an example zeroing routine according to an embodiment.

FIG. 5 shows an example zeroing routine 500 according to an embodiment. The example zeroing routine 500 may be performed by the meter electronics 110, for example. More specifically, the processor(s) 112 of the meter electronics 110 can perform the zeroing routine 500. Alternatively, the zeroing routine 500 (parts thereof) may be performed manually by a user. The zeroing routine 500 may be performed by the meter electronics 110 upon powering of the fluid measuring instrument 100, for example. Alternatively, the zeroing routine 500 may be performed by the meter electronics 100 at predetermined time intervals, as described below.

According to an embodiment, the example zeroing routine 500 can start in step 501 where it is determined whether the sensor housing 102 is submersed in a fluid 330. According to one embodiment, the determination may be based on the resistance between the fluid detecting electrodes 409A, 409B. For example, an open circuit resistance between the electrodes may be determined when the sensor housing 102 is not submersed in a fluid 330, and thus, is surrounded by a medium having a low electrical conductivity. The open circuit resistance may be essentially infinite resistance between the two electrodes 409A, 409B. Conversely, a second resistance between the electrodes 409A, 409B may be determined when the sensor housing 102 is submersed in a fluid 330. Therefore, using the differences in the two resistances, the meter electronics 110 may determine if the sensor housing 102, and thus, the pressure sensor 106A is submersed in a fluid 330 based on the fluid detecting electrodes 409A, 409B. For example, the meter electronics 110 can compare a measured electrical resistance between the two or more electrodes 409A, 409B to a threshold resistance level.

As an alternative to using the fluid detecting electrodes 409A, 409B, a user may manually confirm that the sensor housing 102 and thus, the pressure sensor 106A, is not submersed in fluid 330. This may be necessary or desired if the sensor housing 102 does not include the fluid detecting electrodes 409A, 409B.

Once the sensor housing 102 is removed from the fluid 330, an atmospheric pressure level can be determined from the pressure sensor 106A in step 502. According to one embodiment, the pressure level may comprise a current provided by a strain gauge component, for example. According to one embodiment, the meter electronics 110 may automatically measure a pressure level upon determining that the sensor housing 102 is not submersed in a fluid 330. In another embodiment, the meter electronics 110 may only measure the pressure level upon a user input requesting the pressure level to be obtained. For example, the hand-held controller may comprise a zeroing button that can be depressed by a user, which instructs the meter electronics 110 to measure the pressure level. However, the meter electronics 110 may prevent the pressure level from being obtained unless the sensor housing 102 is out of the fluid, which can be confirmed by the user or by the fluid detecting electrodes 409A, 409B.

According to an embodiment, the pressure level obtained in step 502 comprises an atmospheric pressure at the sensor housing's current location. According to an embodiment, the zeroing routine 500 can store the pressure level obtained in step 503 as a pressure offset 123. The pressure offset 123 can subsequently be utilized by the meter electronics 110 to determine a fluid pressure that is compensated for atmospheric pressure. The pressure offset 123 may be stored as a pressure reading or as an electrical current received from the pressure sensor 106A at a predetermined absolute pressure, for example. The electrical current can be calibrated to correspond to a predetermined pressure. The calibration may be stored in the storage system 120, for example as a look-up table, graph, equation, et cetera.

According to an embodiment, the zeroing routine 500 may wait a predetermined amount of time in step 504. Once the predetermined amount of time is reached, the zeroing routine 500 may return to step 501. For example, the zeroing routine 500 may return to step 501 every thirty minutes in an attempt to update the pressure offset 123. It should be appreciated that thirty minutes is merely an example predetermined amount of time and should in no way limit the scope of the present embodiment. According to another embodiment, the zeroing routine 500 can proceed to step 505 after a predetermined amount of time where the meter electronics 110 requests the user to remove the sensor housing 102 from the fluid in order to obtain a new pressure offset 123. The new pressure offset 123 can account for any changes in the atmospheric pressure between each time the pressure sensor 106A is zeroed.

According to an embodiment, when the zeroing routine 500 is performed multiple times, the updated pressure offsets may simply replace any previously measured pressure offset. Alternatively, the meter electronics 110 can store an average pressure offset that includes the average of the previous N number of pressure offsets. The number N may be determined by a user or may comprise a predetermined number as set by the manufacturer. Storing an average pressure offset may reduce the risk of errors obtained using a single pressure offset measurement.

Once the meter electronics 110 obtains the pressure offset 123, the fluid measuring instrument 100 can be utilized to determine a depth of fluid 330 using the absolute pressure sensor 106A. One example embodiment of determining the fluid depth is depicted in FIG. 6 with an example measurement routine 600.

Figure 6:
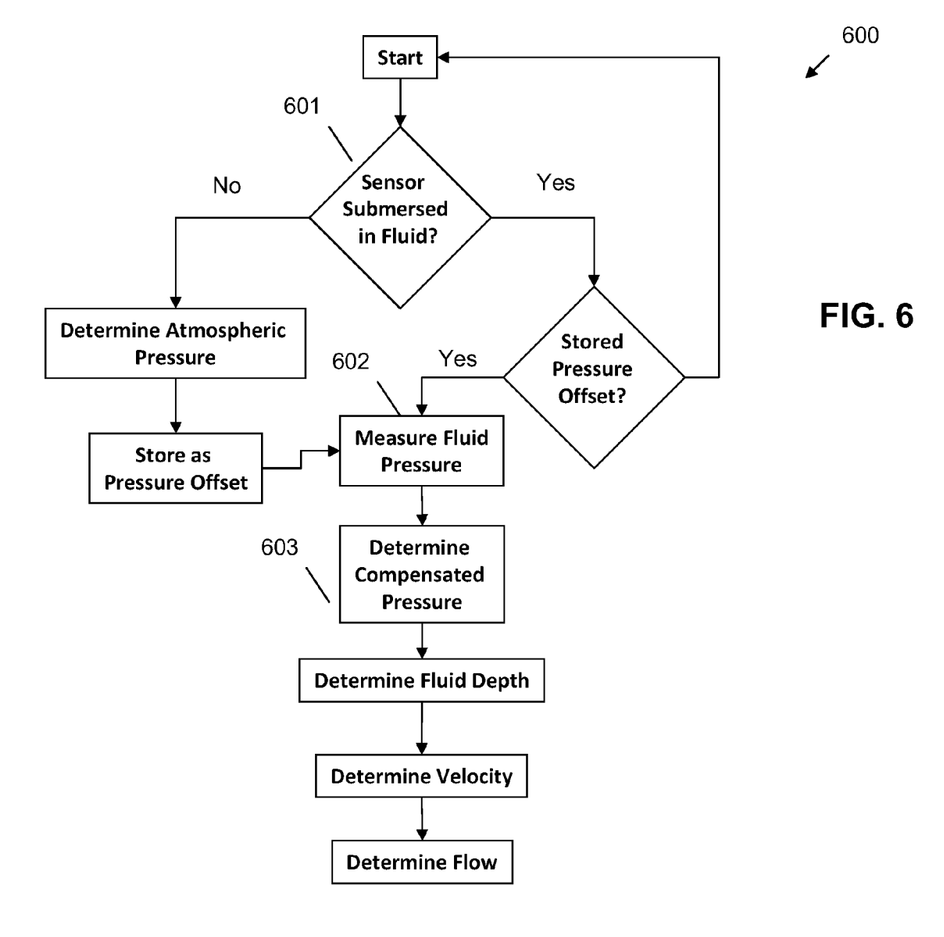
FIG. 6 shows an example measuring routine according to an embodiment.

FIG. 6 shows an example measurement routine 600 according to an embodiment. The measurement routine 600 may be performed by the processor(s) 112, for example, or the measurement routine 600 (parts thereof) may be performed by a user. According to an embodiment, the example measurement routine 600 can start in step 601 where the meter electronics 110 can determine if the sensor housing 102 is submersed in a fluid 330. This determination may be performed based on a signal received from the fluid detecting sensor 106C, for example. Alternatively, if the sensor housing 102 does not include the fluid detecting sensor 106Ca, the determination may be based on a user input confirming the sensor housing 102 is within the fluid 330.

According to an example embodiment, the example measurement routine 600 can proceed to step 602 where a raw pressure measurement is obtained from the pressure sensor 106A. As can be appreciated, the raw pressure measurement obtained during step 602 comprises the fluid pressure as well as the atmospheric pressure. Therefore, the raw pressure measurement obtained during step 602 cannot be utilized to obtain an accurate fluid depth.

According to an embodiment, the example measurement routine 600 can proceed to step 603 where a compensated pressure measurement 124 is determined. The compensated pressure measurement 124 can be based on the raw pressure measurement obtained during step 602 and the pressure offset 123, for example. The compensated pressure measurement 124 compensates for the atmospheric pressure, thereby providing a pressure measurement that can be used to determine the fluid depth using equation (1). According to one embodiment, the compensated pressure measurement 124 may be determined by subtracting the pressure offset 123 from the raw pressure measurement provided during step 602, for example. The compensated pressure measurement may be utilized to determine fluid depth, and other measurements (for example, determined fluid velocity) may be used to determine fluid flow. When determining the fluid depth using equation (1), the fluid density may be estimated or obtained from a previously stored density. For example, the user or operator may input the fluid density based on the fluid. Alternatively, the user or operator may chose a fluid from a list of stored fluids and the meter electronics 110 can determine the density based on the user's selected fluid.

The embodiments described above allow a fluid measuring instrument to utilize an absolute pressure sensor while compensating for changes in the atmospheric pressure. Consequently, the fluid measuring instrument does not suffer from the drawbacks associated with typical differential pressure sensors, which require a vent tube. In contrast, the absolute pressure sensor in the embodiments described above can be periodically removed from the fluid and re-zeroed to compensate for atmospheric pressure variations. In some of the above-described embodiments, the absolute pressure sensor can be re-zeroed automatically upon removal from the fluid. This minimizes user error and maximizes the absolute pressure sensor's accuracy.

Embodiments may be implemented in one or more devices, such as meter electronics, sensors, et cetera, each of which may be configured appropriately to execute program instructions consistent with the functionality of the example embodiments as described herein. As will be appreciated by one skilled in the art, various aspects may be embodied as a system, method or program product. Accordingly, aspects may take the form of an entirely hardware embodiment or an embodiment including software that may all generally be referred to herein as a "circuit," "module" or "system." Furthermore, aspects may take the form of a program product embodied in one or more device readable storage mediums having program code embodied therewith.

Any combination of one or more non-signal storage mediums may be utilized. A storage medium may be, for example, an electronic, magnetic, optical, electromagnetic, infrared, or semiconductor system, apparatus, or device, or any suitable combination of the foregoing. Program code embodied on a storage medium may be transmitted using any appropriate medium, including but not limited to wireless, wireline, optical fiber cable, RF, et cetera, or any suitable combination of the foregoing. Program code for carrying out operations may be written in any combination of one or more programming languages. The program code may execute entirely on a single device, partly on a single device, as a stand-alone software package, partly on single device and partly on another device, or entirely on a remote device in communication with a first device, such as illustrated in FIG. 2 by communication between meter electronics 110 and remote device(s). In some cases, the devices may be connected through any type of network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

The detailed descriptions of the above example embodiments are not exhaustive descriptions of all embodiments contemplated. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments.

Thus, although illustrative example embodiments have been described herein with reference to the accompanying figures, it is to be understood that this description is not limiting and that various other changes and modifications may be affected by one skilled in the art without departing from the scope or spirit of the disclosure.

What is claimed is:

1. A method, comprising:
    determining that an absolute pressure sensor is not submersed in a fluid by comparing an electrical resistance between two or more electrodes to a predetermined threshold;
    measuring an atmospheric pressure with the absolute pressure sensor to determine an offset pressure measurement;
    submersing the absolute pressure sensor in a fluid; and
    measuring pressure with the absolute pressure sensor;
    wherein a compensated pressure measurement of the fluid is determined based on the pressure measured for the fluid and the offset pressure measurement.

2. The method of claim 1, wherein the step of determining that the absolute pressure sensor is not submersed includes processing manual input.

3. The method of claim 1, further comprising storing a plurality of measured atmospheric pressures to determine an average pressure offset.

4. The method claim 1, wherein the absolute pressure sensor contains a pressure transducer.

5. The method of claim 1, further comprising determining a fluid velocity.

6. The method of claim 5, further comprising determining a flow rate of the fluid.

7. An absolute pressure sensor, the absolute pressure sensor comprising:
    two or more electrodes;
    one or more processors; and
    a storage device storing program code executable by the one or more processors to perform acts comprising:
        determining that the absolute pressure sensor is not submersed in a fluid by comparing an electrical resistance between the two or more electrodes to a predetermined threshold;
        measuring an atmospheric pressure with the sensor not submersed to determine an offset pressure measurement;
        determining that the absolute pressure sensor is submersed in fluid; and
        measuring pressure with the sensor submersed;
        wherein a compensated pressure measurement of the fluid is determined based on the pressure measured for the fluid and the offset pressure measurement.

8. The absolute pressure sensor of claim 7, wherein the step of determining that the absolute pressure sensor is not submersed includes processing manual input.

9. The absolute pressure sensor of claim 7, wherein the storage device further comprises a plurality of measured atmospheric pressures, and further wherein the program code is executable by the one or more processors to determine an average pressure offset using the plurality of measured atmospheric pressures.

10. The absolute pressure sensor of claim 7, wherein the absolute pressure sensor contains a pressure transducer.

11. The absolute pressure sensor of claim 7, the program code is executable by the one or more processors to determine a fluid velocity.

12. The absolute pressure sensor of claim 11, the program code is executable by the one or more processors to determine a flow rate of the fluid.

13. A system, comprising:
an absolute pressure sensor, the absolute pressure sensor comprising:
two or more electrodes;
one or more processors; and
a storage device storing program code executable by the one or more processors to perform acts comprising:
determining that the absolute pressure sensor is not submersed in a fluid by comparing an electrical resistance between the two or more electrodes to a predetermined threshold;
measuring an atmospheric pressure with the sensor not submersed to determine an offset pressure measurement;
determining that the absolute pressure sensor is submersed in fluid; and
measuring pressure with the sensor submersed;
wherein a compensated pressure measurement of the fluid is determined based on the pressure measured for the fluid and the offset pressure measurement.

14. The system of claim 13, wherein the absolute pressure sensor is distributed across two or more components.

15. The system of claim 14, wherein at least one component of the two or more components is a main sensor housing including at least a pressure sensor element, and wherein at least one other component of the two or more components includes the storage device and the one or more processors.

16. The system of to claim 15, wherein the main sensor housing further includes at least a fluid submersion detection arrangement and a fluid velocity element.

17. The system of claim 15, wherein the main sensor housing and the at least one other component are connected via a communication arrangement.

18. The system of claim 17, wherein the communication arrangement includes one of a wired communication cable and a wireless communication arrangement.

* * * * *